US012609000B2

(12) United States Patent
Marks

(10) Patent No.: US 12,609,000 B2
(45) Date of Patent: Apr. 21, 2026

(54) SYSTEMS AND METHODS FOR PROVIDING A PLURALITY OF PLAYER SELECTABLE VOLATILITY OPTIONS AND REPLICATING SYMBOLS DURING FREE GAMES OF THE PLAYER SELECTED VOLATILITY OPTIONS

(71) Applicant: Aristocrat Technologies, Inc., Las Vegas, NV (US)

(72) Inventor: Daniel Marks, Decatur, GA (US)

(73) Assignee: Aristocrat Technologies, Inc., Las Vegas, NV (US)

(*) Notice: Subject to any disclaimer, the term of this patent is extended or adjusted under 35 U.S.C. 154(b) by 102 days.

(21) Appl. No.: 18/146,917

(22) Filed: Dec. 27, 2022

(65) Prior Publication Data

US 2023/0137152 A1 May 4, 2023

Related U.S. Application Data

(63) Continuation of application No. 17/010,030, filed on Sep. 2, 2020, now Pat. No. 11,545,002.

(60) Provisional application No. 62/895,152, filed on Sep. 3, 2019.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3267; G07F 17/3213; G07F 17/34
See application file for complete search history.

(56) References Cited

U.S. PATENT DOCUMENTS 5,584,763 A * 12/1996 Kelly ........................ A63F 5/04 463/16
6,186,894 B1 2/2001 Mayeroff
6,634,941 B2 * 10/2003 Olive .................. G07F 17/3244 463/16
6,648,758 B2 11/2003 Bennett
6,652,378 B2 11/2003 Cannon
7,819,741 B1 10/2010 Luciano
(Continued)

OTHER PUBLICATIONS

Office Action (Non-Final Rejection) dated Mar. 2, 2022 for U.S. Appl. No. 17/010,030 (pp. 1-13).
(Continued)

*Primary Examiner* — Jeffrey K Wong
(74) *Attorney, Agent, or Firm* — Armstrong Teasdale LLP

(57) ABSTRACT

An electronic gaming machine includes a processor configured to control a display device to display a first matrix of symbol positions, and to evaluate a plurality of symbols displayed in the first matrix to determine whether to award a plurality of free games. If free games are awarded, the processor may control the display device to display a plurality of volatility options, each of which may be associated with one or more additional matrices of symbol positions. In addition, the processor may receive a player selection of one volatility option of the plurality of volatility options, and to control the display device to display the one or more additional matrices of symbol positions associated with the player selected volatility option.

20 Claims, 11 Drawing Sheets

(56) References Cited

U.S. PATENT DOCUMENTS

| | | | | |
|---|---|---|---|---|
| 8,333,657 | B1 | 12/2012 | Nelson | |
| 8,371,927 | B2 | 2/2013 | Englman | |
| 8,915,786 | B2 | 12/2014 | Baerlocher | |
| 9,165,427 | B2 | 10/2015 | Thomas | |
| 9,390,580 | B2 | 7/2016 | Detlefsen | |
| 10,032,339 | B2 * | 7/2018 | Mead | G07F 17/3213 |
| 10,192,390 | B2 | 1/2019 | Hughes | |
| 10,810,840 | B2 | 10/2020 | Casey | |
| 2002/0183105 | A1 | 12/2002 | Cannon | |
| 2003/0073480 | A1 * | 4/2003 | Thomas | G07F 17/3262 463/18 |
| 2005/0054419 | A1 | 3/2005 | Souza | |
| 2007/0060252 | A1 | 3/2007 | Taylor | |
| 2008/0026831 | A1 * | 1/2008 | Wright | G07F 17/3281 463/26 |
| 2008/0039177 | A1 * | 2/2008 | Okada | G07F 17/3267 463/20 |
| 2008/0076521 | A1 | 3/2008 | Little | |
| 2009/0124371 | A1 * | 5/2009 | Gilmore | G07F 17/3258 463/27 |
| 2010/0004047 | A1 | 1/2010 | Acres | |
| 2010/0029381 | A1 | 2/2010 | Vancura | |
| 2010/0041461 | A1 | 2/2010 | Demsetz | |
| 2011/0105218 | A1 * | 5/2011 | Anderson | G07F 17/32 463/20 |
| 2011/0159942 | A1 * | 6/2011 | Cram | G07F 17/329 463/17 |
| 2012/0172107 | A1 | 7/2012 | Acres | |
| 2013/0267301 | A1 | 10/2013 | Suda | |
| 2013/0273997 | A1 | 10/2013 | Stewart | |
| 2013/0331173 | A1 | 12/2013 | Jaffe | |
| 2014/0248939 | A1 | 9/2014 | Kroon | |
| 2014/0309013 | A1 | 10/2014 | Meyer | |
| 2015/0199868 | A1 | 7/2015 | Kelly | |
| 2016/0027251 | A1 | 1/2016 | Selegue | |
| 2016/0086431 | A1 | 3/2016 | Berman | |
| 2016/0247361 | A1 | 8/2016 | Meyer | |
| 2017/0092070 | A1 | 3/2017 | Marston | |
| 2017/0092073 | A1 | 3/2017 | Nakamura | |
| 2017/0103613 | A1 * | 4/2017 | Berman | G07F 17/3267 |
| 2017/0372558 | A1 | 12/2017 | You | |
| 2018/0182202 | A1 | 6/2018 | Shiraishi | |
| 2019/0188964 | A1 | 6/2019 | San | |
| 2020/0090457 | A1 | 3/2020 | Wright | |
| 2021/0217276 | A1 | 7/2021 | Sidoti | |

OTHER PUBLICATIONS

Office Action (Notice of Allowance and Fees Due (PTOL-85)) dated Sep. 16, 2022 for U.S. Appl. No. 17/010,030 (pp. 1-8).

"Deuces Wild Video Poker! (live play) Triple Play Multi-hand", https://www.youtube.com/watch?v=joYz8LIWVv8, May 9, 2018.

Office Action dated Aug. 3, 2021 for U.S. Appl. No. 16/927,120 (pp. 1-16).

Office Action (Notice of Allowance and Fees Due (PTOL-85)) dated Jan. 14, 2022 for U.S. Appl. No. 16/927,120 (pp. 1-8).

Office Action (Non-Final Rejection) dated May 17, 2023 for U.S. Appl. No. 17/705,223 (pp. 1-10).

Office Action (Final Rejection) dated Oct. 19, 2023 for U.S. Appl. No. 17/705,223 (pp. 1-10).

Office Action (Non-Final Rejection) dated Feb. 20, 2024 for U.S. Appl. No. 17/705,223 (pp. 1-10).

Office Action (Non-Final Rejection) dated Jul. 19, 2024 for U.S. Appl. No. 17/705,223 (pp. 1-13).

* cited by examiner

SYSTEMS AND METHODS FOR PROVIDING A PLURALITY OF PLAYER SELECTABLE VOLATILITY OPTIONS AND REPLICATING SYMBOLS DURING FREE GAMES OF THE PLAYER SELECTED VOLATILITY OPTIONS

CROSS REFERENCE TO RELATED APPLICATIONS

This application is a continuation of and claims priority to U.S. patent application Ser. No. 17/010,030, filed Sep. 2, 2020, which claims priority to U.S. Provisional Patent Application 62/895,152, filed Sep. 3, 2019, which are incorporated herein by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Although some known wagering games include volatility selection options, traditionally, volatility selection options do not permit players to duplicate reels, nor are players permitted an option to duplicate or add sets of reels in conjunction with one or more additional or free games. Traditional volatility selection options also do not permit replication of symbols between reel sets, such as between newly added sets of reels, during play of one or more additional or free games.

SUMMARY

In one aspect, an electronic gaming machine is provided. The electronic gaming machine includes a display device, a memory, and a processor. In at least some embodiments, the processor may be configured to execute instructions stored in the memory, which when executed, cause the processor to at least control the display device to display a first matrix of symbol positions, where the first matrix includes a plurality of columns and a plurality of rows. The instructions may also cause the processor to evaluate a plurality of symbols displayed in the first matrix of symbol positions to determine whether to award a plurality of free games, and if the plurality of free games are awarded, to control the display device to display a plurality of volatility options, each of which may be associated with one or more additional matrices of symbol positions. The instructions may, in addition, cause the processor to receive a player selection of one volatility option of the plurality of volatility options, as well as to control the display device to display the one or more additional matrices of symbol positions associated with the player selected volatility option.

In another aspect, an electronic gaming machine is provided. The electronic gaming machine includes a display device, a processor, and a memory storing instructions. The instructions which when executed by the processor, cause the processor to control the display device to display a first matrix of symbol positions, the first matrix including a plurality of columns, evaluate a plurality of symbols displayed in the first matrix of symbol positions to determine whether to initiate display of a bonus game, in response to initiating the display of the bonus game, control the display device to display a plurality of volatility options, each volatility option associated with a corresponding quantity of matrices and a corresponding quantity of frees spins, receive a player selection corresponding to a selected volatility option of the plurality of volatility options, the selected volatility option having a selected quantity of matrices and a selected quantity of free spins, and for each spin of the selected quantity of free spins: determine at least a partial free spin outcome for the first matrix, display the partial free spin game outcome in the first matrix, in response to determining that the partial free spin game outcome includes a trigger condition, display an additional quantity of matrices adjacent to the first matrix, the additional quantity of matrices based on the selected quantity of matrices, and determine a free spin outcome for each of the additional quantity of matrices.

In yet another aspect a method is provided. The method includes controlling a display device to display a first matrix of symbol positions, the first matrix including a plurality of columns, evaluating a plurality of symbols displayed in the first matrix of symbol positions to determine whether to initiate display of a bonus game, in response to initiating the display of the bonus game, controlling the display device to display a plurality of volatility options, each volatility option associated with a corresponding quantity of matrices and a corresponding quantity of frees spins, receiving a player selection corresponding to a selected volatility option of the plurality of volatility options, the selected volatility option having a selected quantity of matrices and a selected quantity of free spins, and for each spin of the selected quantity of free spins: determining at least a partial free spin outcome for the first matrix, displaying the partial free spin game outcome in the first matrix, in response to determining that the partial free spin game outcome includes a trigger condition, displaying an additional quantity of matrices adjacent to the first matrix, the additional quantity of matrices based on the selected quantity of matrices, and determining a free spin outcome for each of the additional quantity of matrices.

In yet another aspect a non-transitory computer readable storage medium is provided. The computer readable storage medium stores instructions, which when executed, cause a processor to control the display device to display a first matrix of symbol positions, the first matrix including a plurality of columns, evaluate a plurality of symbols displayed in the first matrix of symbol positions to determine whether to initiate display of a bonus game, in response to initiating the display of the bonus game, control the display device to display a plurality of volatility options, each volatility option associated with a corresponding quantity of matrices and a corresponding quantity of frees spins, receive a player selection corresponding to a selected volatility option of the plurality of volatility options, the selected volatility option having a selected quantity of matrices and a selected quantity of free spins, and for each spin of the selected quantity of free spins: determine at least a partial free spin outcome for the first matrix, display the partial free spin game outcome in the first matrix, in response to determining that the partial free spin game outcome includes a trigger condition, display an additional quantity of matrices adjacent to the first matrix, the additional quantity of matrices based on the selected quantity of matrices, and determine a free spin outcome for each of the additional quantity of matrices.

DETAILED DESCRIPTION

Embodiments of the present disclosure describe systems and methods for providing a plurality of player selectable volatility options, each of which may be associated with a different number of bonus matrices and/or a different number of free games. The player selected volatility options may be provided in association with a bonus game, which may be triggered from a base game in response to the occurrence of one or more designated or trigger symbols. In addition, in response to a player selection of a volatility option, the plurality of bonus matrices associated with that option may be displayed and populated by symbols in a variety of ways. Specifically, in at least one embodiment, symbols may be displayed in one or more columns of a first bonus matrix and replicated to corresponding columns of the other bonus matrices. The wagering game of the present disclosure therefore enables presentation of a number of bonus matrices and population of those bonus matrices using one or more replicated columns of symbols to achieve a unique and exciting volatility selection and bonus feature.

Figure 1:
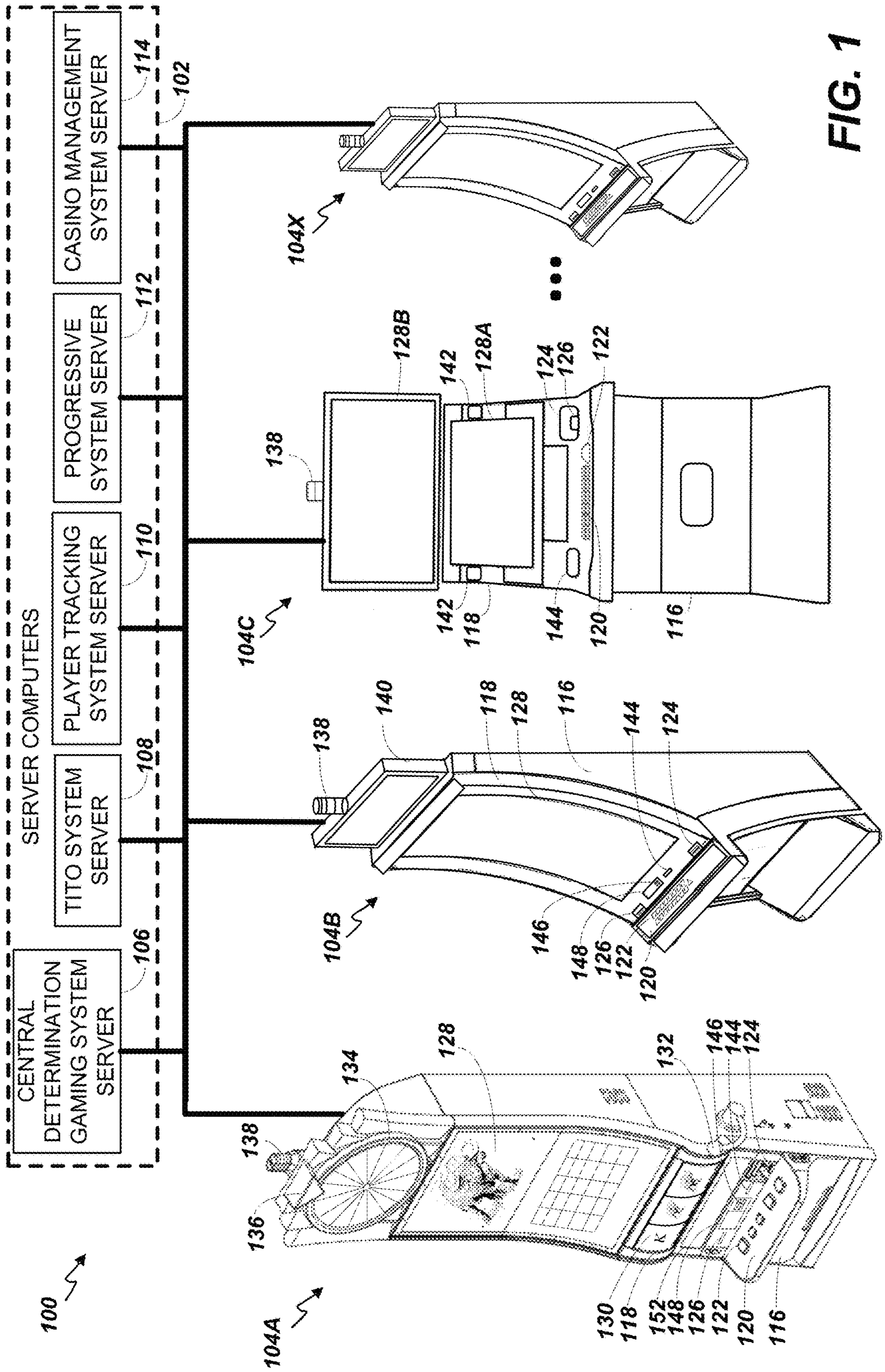
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
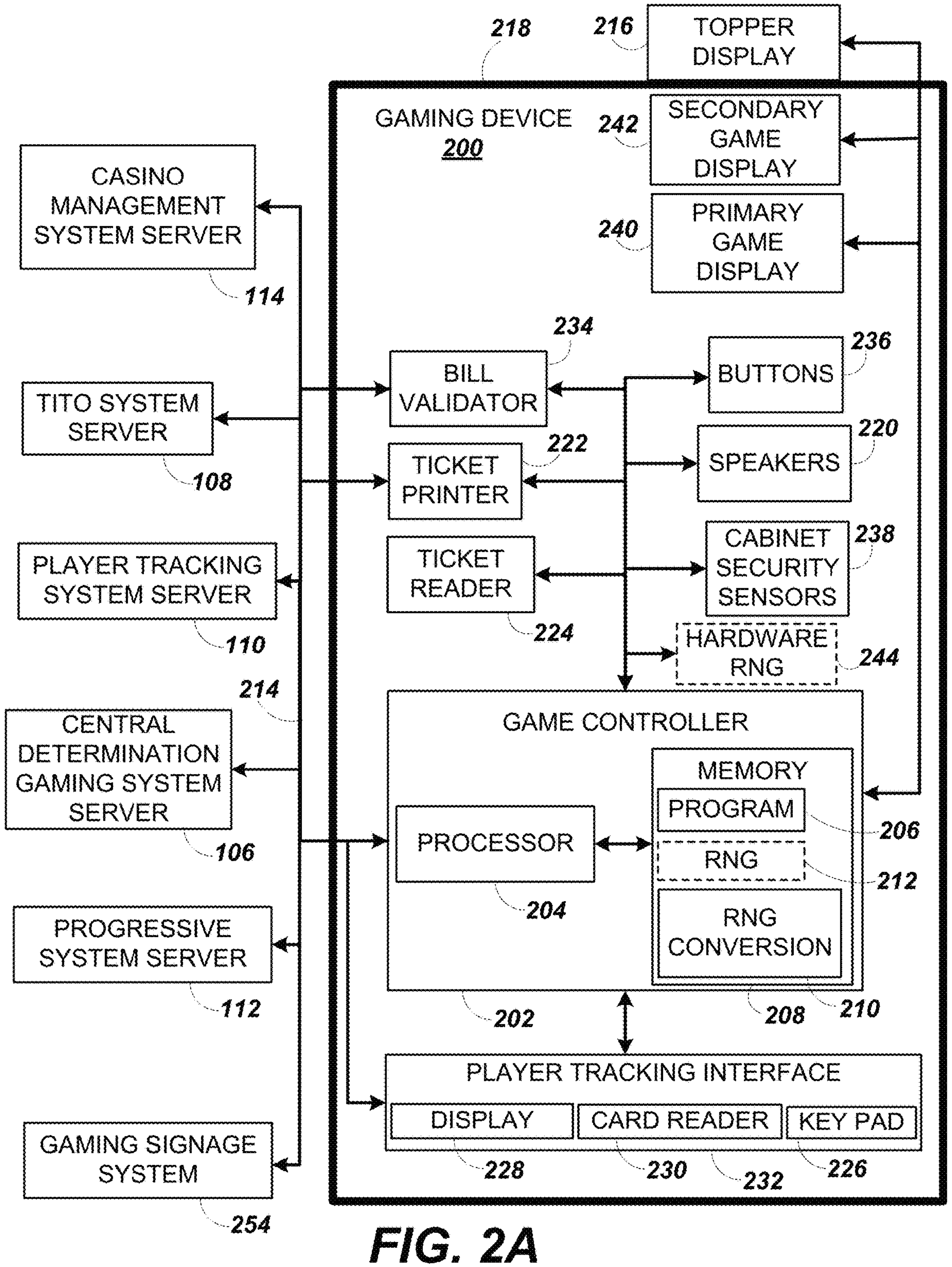
FIG. 2A is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
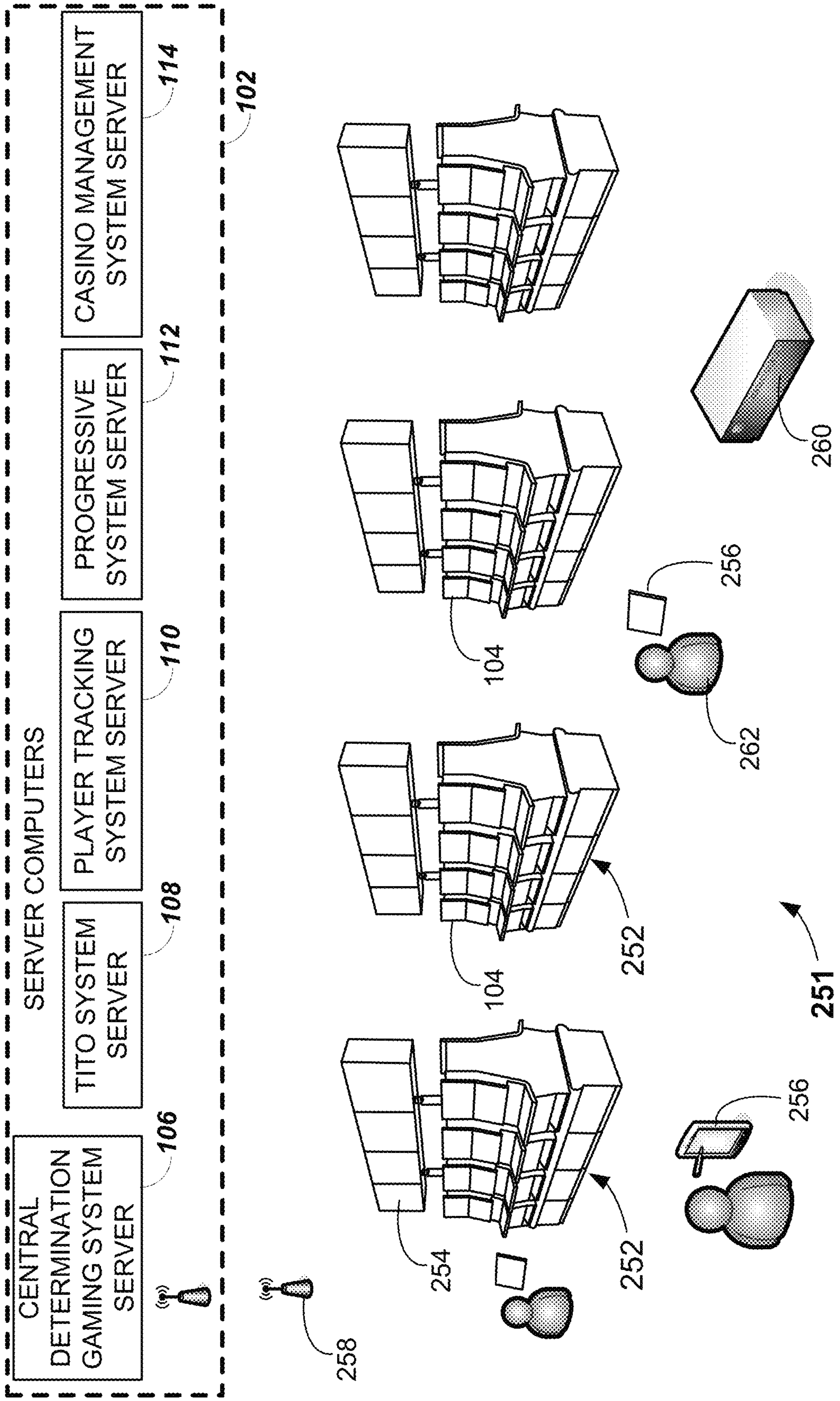
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
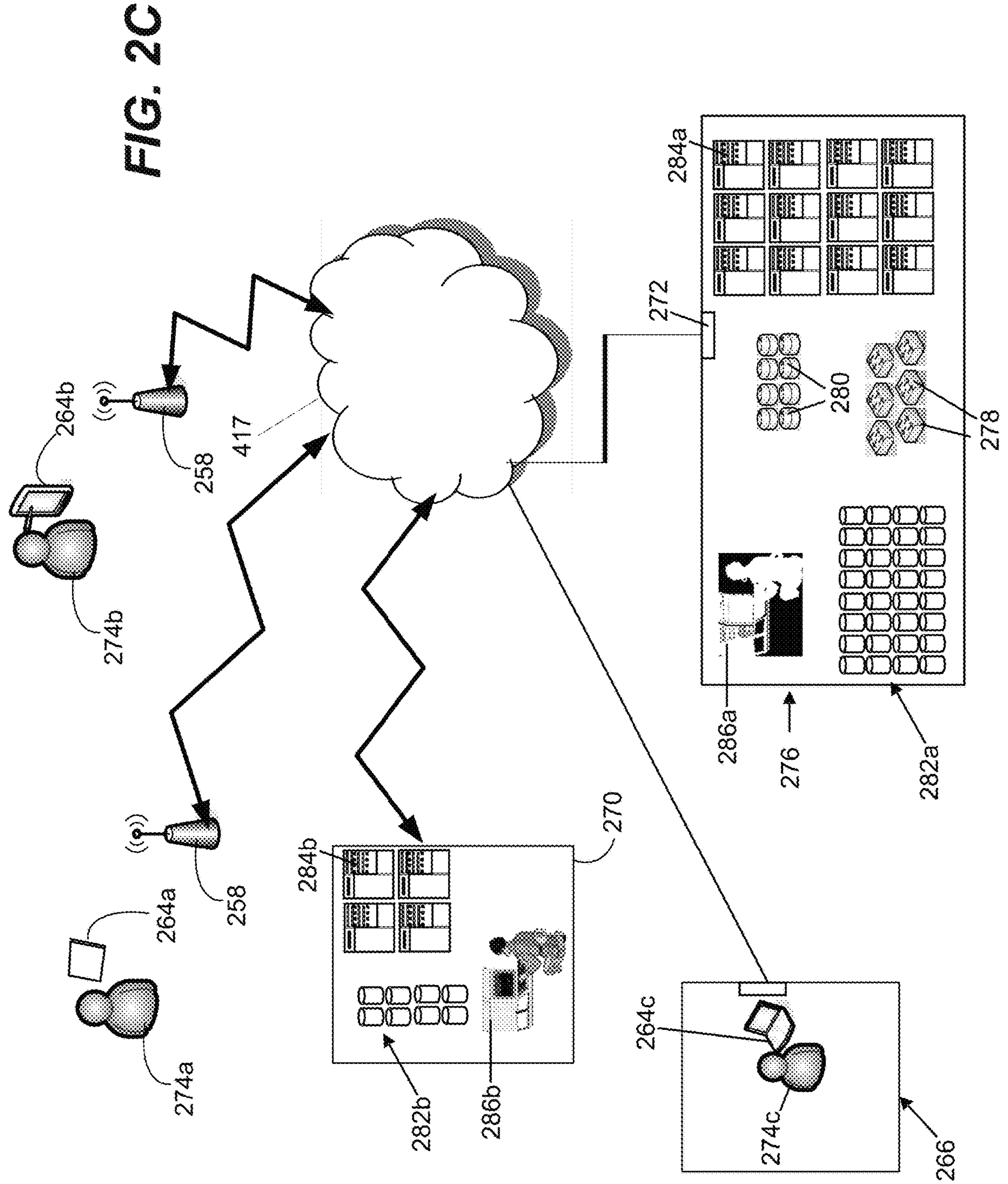
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
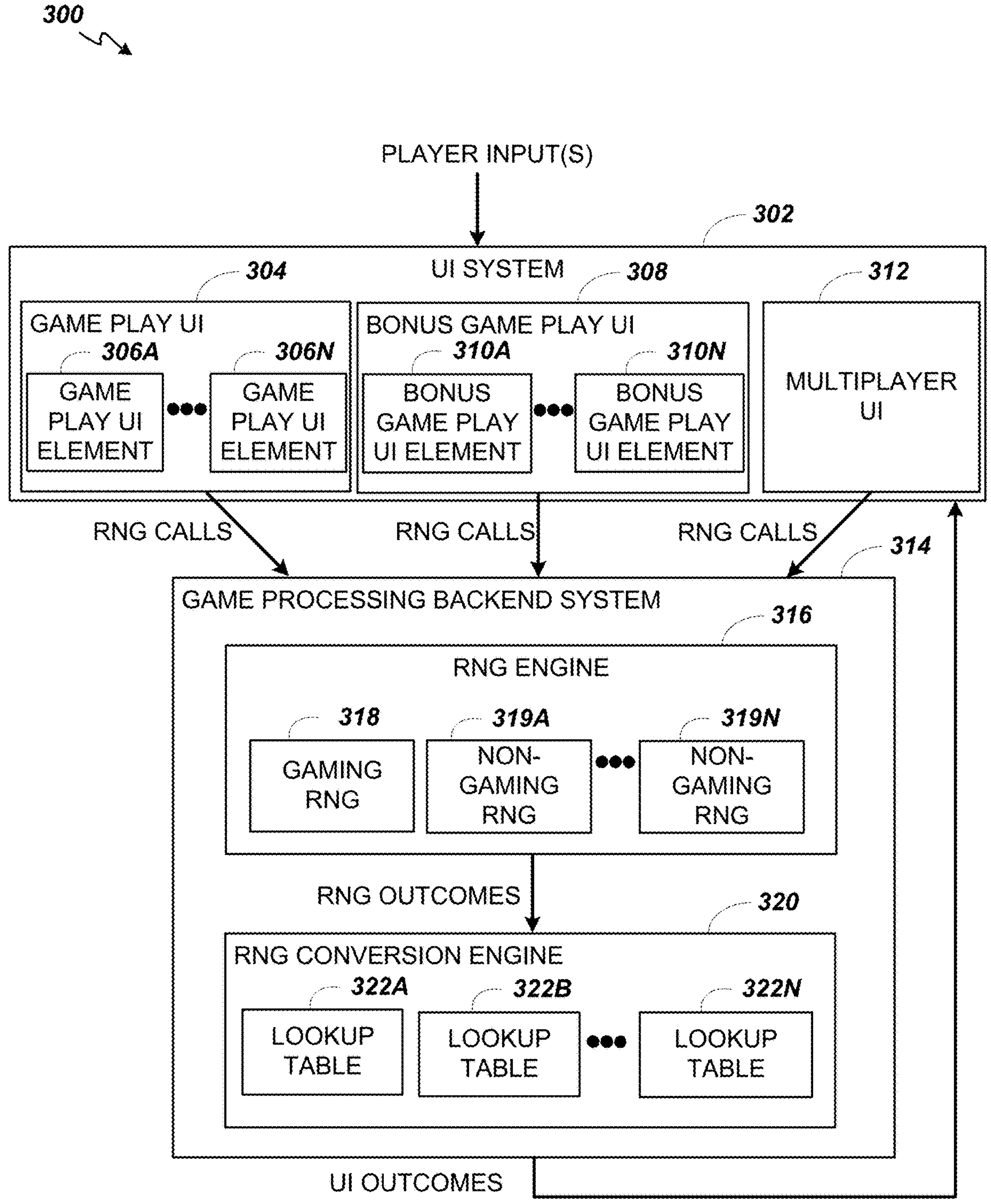
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 304, and one or more multiplayer UIs 306, where each UI type includes one or more mechanical UIs and/or graphical UIs (GUIs). In other words, game play UI 304, bonus game play UI 304, and the multiplayer UI 304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4:
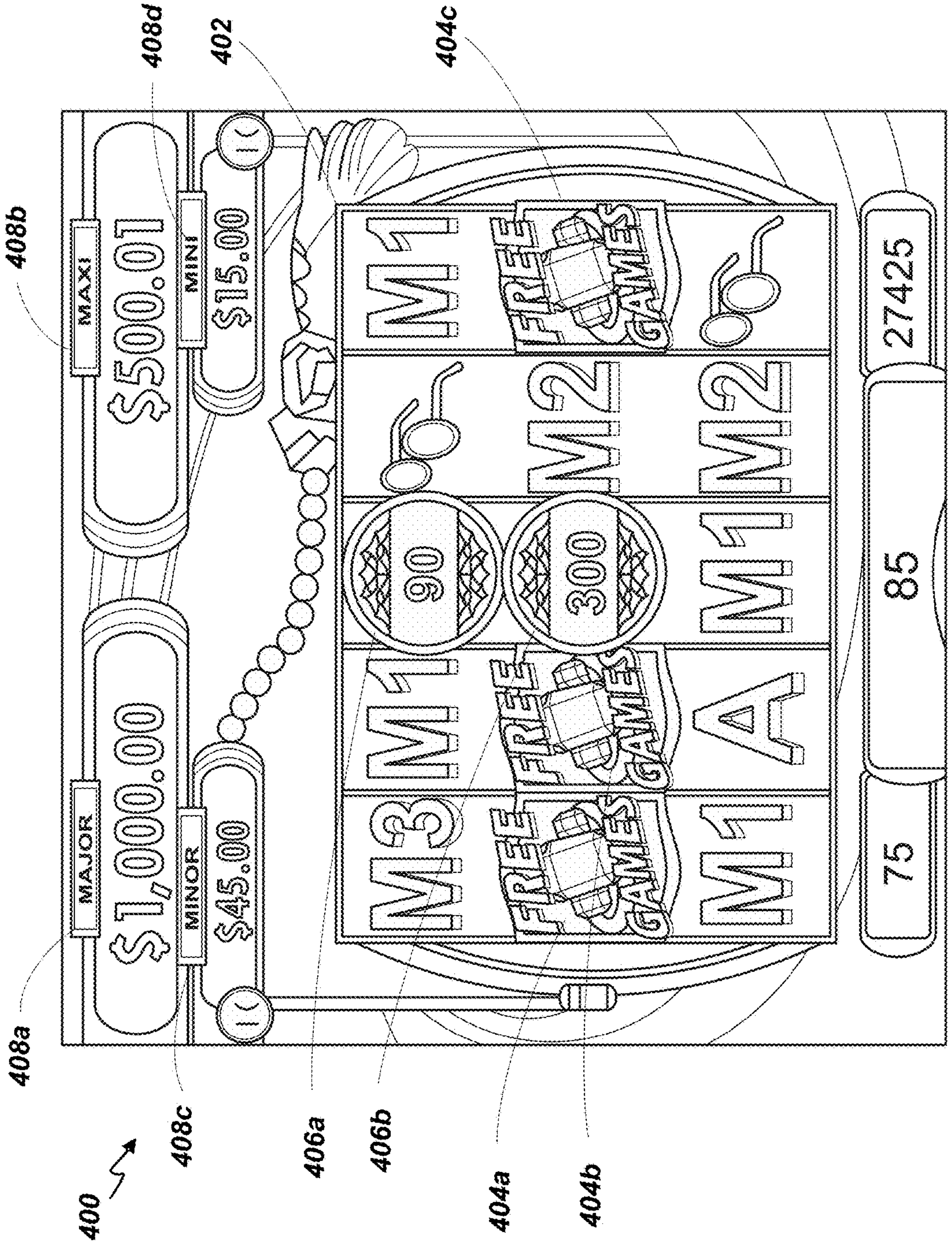
FIG. 4 illustrates a view of an exemplary user interface for an EGM in accordance with various embodiments of the disclosure.

FIG. 4 illustrates an exemplary user interface for an EGM in accordance with various embodiments of the disclosure. Specifically, FIG. 4 depicts a user interface 400 of a base game. In the example embodiment, user interface 400 includes a matrix of symbol positions 402 (or simply "matrix" 402). The symbol positions of matrix 402 are arranged in a plurality of rows and a plurality of columns. More particularly, in the example embodiment, matrix 402 is a 3×5 matrix having three rows and five columns. However, in other embodiments, matrix 402 may be any size (e.g., 2×2, 3×3, 4×4, 10×10, etc.). Further, in other embodiments, the symbol positions may be arranged in non-rectangular matrices, such as in a 3×4×5×4×3 configuration.

In the example embodiment of FIG. 4, matrix 402 includes fifteen symbol positions. However, the number of symbol positions in matrix 402 may vary depending upon a number of rows and columns displayed in matrix 402. In some embodiments, matrix 402 may be replaced by one or more mechanical reels, and/or a combination of mechanical reels and one or more matrices.

As described herein, during play of a game displayed on user interface 400, symbols may be selected (e.g., such as from a plurality of reel strips) and displayed in the symbol positions of each column of symbols within matrix 402. Although not central to an understanding of the present disclosure, a "reel strip" may include a plurality of symbols arranged in a vertical column. To display symbols from a reel strip in a column of symbol positions within matrix 402, processor 204 may simulate spinning and stopping of a reel strip within one or more columns of matrix 402. Here again, however, mechanical reels having physical reel strips may in some cases also be used.

When a respective reel strip is simulated to stop within an associated column, one or more symbols may be displayed from the reel strip in the symbol positions of the column. Processor 204 may use a random number generator to generate a random number to determine the reel stop position of each of the reels. For example, one or more random numbers may be provided by RNG engine 316, as described herein. The symbols displayed after spinning and stopping each reel strip in a respective column of matrix 402 may be referred to herein as a "reel outcome" or a "reel game outcome." Thus, a rotation and stopping of a plurality of reel strips may be simulated by processor 204 within the columns of matrix 402 to cause a reel outcome, including a plurality of symbols, to be displayed from the plurality of reel strips within the columns of matrix 402.

It will also be appreciated that symbols may be displayed in matrix 402 in response to one or more player wagers and inputs and/or, in some cases, when one or more bonus games may be triggered for display. Symbols may, in addition, be selected randomly, such as based upon a random number provided by RNG 212 and/or, in at least some embodiments, based upon one or more bingo or lottery game outcomes.

To initiate the play of the game displayed in user interface 400, a player may place a wager, which may cause a base game to be initiated. In the base game, processor 204 may control a display device, such as primary or secondary display 240 and/or 242, to simulate spinning and stopping of a plurality of reel strips (as described above), and symbols to be displayed in each symbol position of matrix 402.

The symbols displayed in matrix 402 may be evaluated, such as by processor 204, to determine whether there are any winning combinations of symbols. Specifically, the symbols displayed in matrix 402 may be compared to one or more winning symbol combinations in a paytable of winning symbol combinations, and if any winning symbol combinations are displayed, an award associated with each combination may be added to a player's credit balance.

A set of symbols may be used to populate the reel strips. The symbols and order of symbols on the reel strips may be predetermined or randomly determined prior to each spin. The symbol set may include certain designated symbols, such as designated symbols 404 which may trigger certain events such as bonus games, etc. Additionally, the symbols may include certain configurable symbols, such as configurable symbols 406. In an embodiment, the configurable symbols each comprise at least a common component and at least a variable component. The variable component is indicative of a value of a prize that is associated with each of the configurable symbols. An example of a configurable symbol is shown in the form of a coin symbol 406. The common component is the coin itself, while the variable component is the indicia overlaying the coin. In this case, indicia are numerals directly indicative of the value of the prize, such as 90 for **406*a* and 300 for 406*b*. In other embodiments, the indicia indirectly indicates the value of the prize or indicates a name of a prize, such as various progressive prizes like the "major" prize 408*a*, "maxi" prize 408*b*, "minor" prize 408*c* or "mini" prize 408*d***.

In addition, the symbols displayed in matrix 402 may be evaluated to determine whether one or more bonus trigger conditions are satisfied. In the example embodiment, a bonus trigger condition may be satisfied if at least three "designated symbols" are displayed (or "land") within matrix 402. However, in other embodiments, a variety of other suitable trigger conditions may be implemented. As used herein, a "designated symbol" may include any symbol that is used, or designated, to trigger a bonus game. For example, in FIG. 4, designated symbols include the phrase "FREE GAMES." Specifically, a first designated symbol **404*a*, a second designated symbol 404*b* and a third designated symbol appears at symbol position 404*c*** appear in the outcome of the play of the game.

Figure 5:
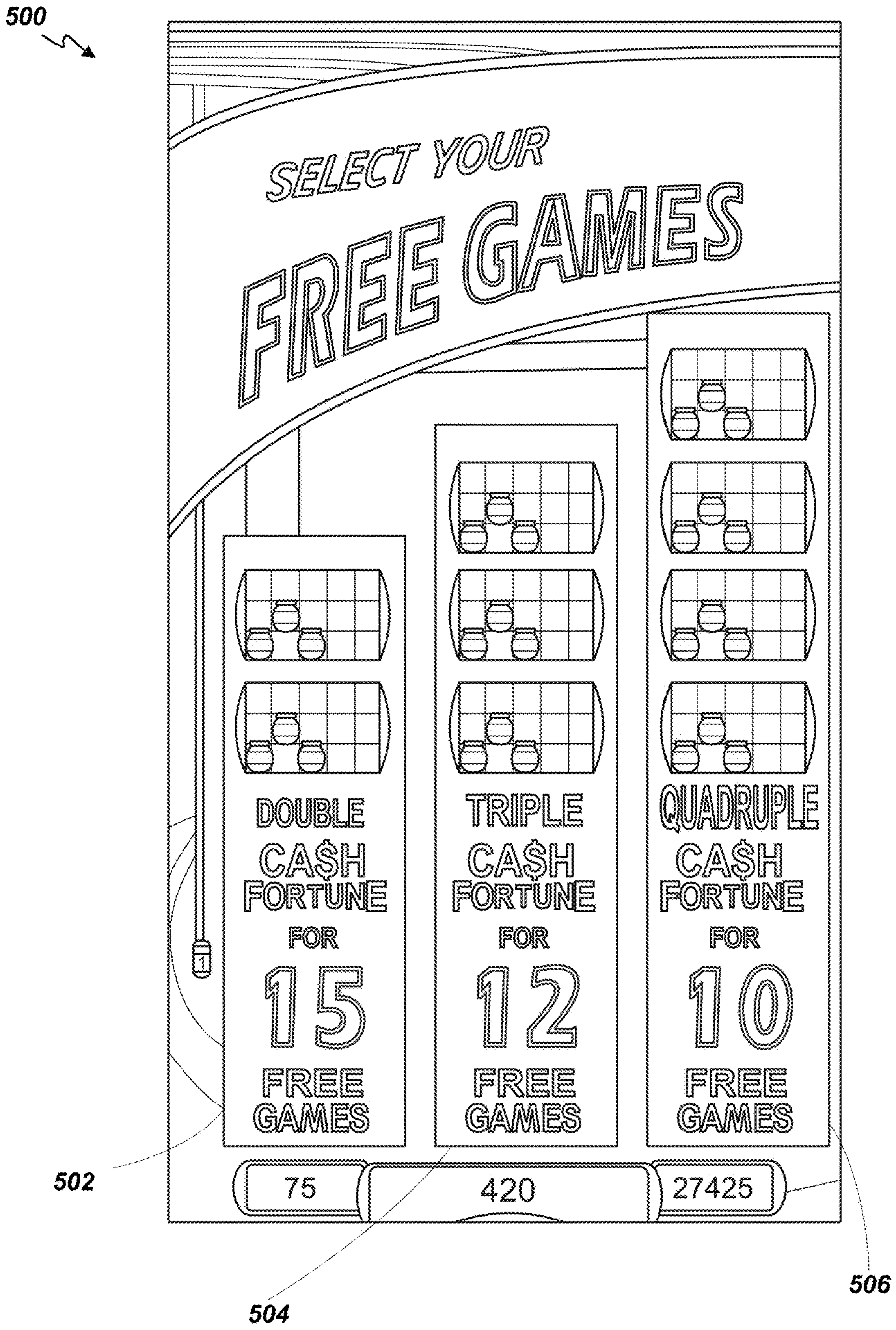
FIG. 5 illustrates a view of an exemplary volatility selection interface displaying a plurality of volatility options in accordance with various embodiments of the disclosure.

FIG. 5 illustrates a view of an exemplary volatility selection interface displaying a plurality of volatility options in accordance with various embodiments of the disclosure. As described above, the bonus game may be triggered in response to the occurrence of one or more designated symbols within matrix 402. In at least one embodiment, volatility selection interface 500 may also be provided during a base game, such as, for instance, in response to a player placing an additional wager (e.g., a side wager or an ante wager) in combination with a trigger event (such as certain symbols being displayed, a random trigger, etc.) that causes presentation of volatility selection interface 500 (or, in some cases, adds a chance that interface 500 may appear during the base game). Accordingly, volatility selection interface 500 may be provided, in different embodiments, at different stages or phases of wagering game 400.

In the example embodiment, volatility selection interface 500 includes a plurality of volatility options, such as a first volatility option 502, a second volatility option 504, and a third volatility option 506. Each volatility option 502-506 is player selectable and associated with a quantity of bonus matrices and a quantity of free games.

For example, first volatility option 502 may be associated with two bonus matrices and fifteen free games. As a result of the two bonus matrices associated with first volatility option 502, this option 502 may be referred to herein as a "double" volatility option. Similarly, second volatility option 504 may be associated with three bonus matrices and twelve free games. Second volatility option 504 may be referred to herein as a "triple" volatility option. Finally, third volatility option 506 may be associated with four bonus matrices and ten free games. Fourth volatility option may be referred to as a "quadruple" volatility option.

The numbers of bonus matrices associated with each of the double, triple, and quadruple volatility options 502-506 are merely exemplary, however, and greater or fewer numbers of bonus matrices and/or free games may be applied to each volatility option 502-506. Generally, as the number of bonus matrices increases, the number of free games provided may decrease, and vice versa. Thus, a player may perceive a trade-off between the number of free games and the number of bonus matrices, and the player may make a selection of a volatility option 502-506, as described herein, depending upon the player's preference for experiencing the trade-off.

In certain embodiments, additional or alternate choices may be provided in volatility selection interface. For example, instead of or in addition to the quantity of free spins, an option may include the height of the interface. Further, one option may correspond to a range of values or multipliers that may apply to the configurable symbols.

One specific improvement associated with allowing player selection of a volatility option associated with a plurality of bonus matrices (e.g., double, triple, or quadruple) and a plurality of free games is that players are provided enhanced control over volatility of the wagering game. Specifically, players are not only able to select one or the other of a number of bonus matrices and a number of free games, but options including both of these features. As a result, the level of control that players have (and feel that they have) over the bonus game and the volatility of the bonus game is greatly enhanced.

In addition, when the bonus matrices are displayed in the volatility selection interface 500, the matrices are not populated by actual reel outcomes. Rather, at this stage, bonus matrices are only displayed to illustrate a visual appearance of each of the double, triple, and quadruple volatility options 502-506 and to provide a visual explanation to a player of what each volatility option 502-506 includes.

In some embodiments, one or more minor disincentives may be added to the bonus game to discourage a player from always selecting the quadruple (or another) volatility option 506. For instance, as described above, quadruple volatility option 506 may be associated with the fewest number of free games. Likewise, quadruple volatility option 506 may be associated with a greatest cost (e.g., as described above, when a player pays an additional amount for presentation of volatility selection interface 500). In one additional example, a payout associated with the quadruple volatility option 506 may be least among volatility options 502-506. However, in at least one other embodiment, these disincentives are not applied to the quadruple volatility option 506, in which case selection of the quadruple volatility option 506 may indeed be a most popular selection among players of wagering game 400 when it is available and presented.

In certain embodiments, the volatility selection may be tied to a player wager amount. For example, a first wager amount may only enable selection of volatility options 502 and 504. A second higher wager amount may enable the selection of volatility options 502, 504 or 506, when the feature is triggered.

Figure 6:
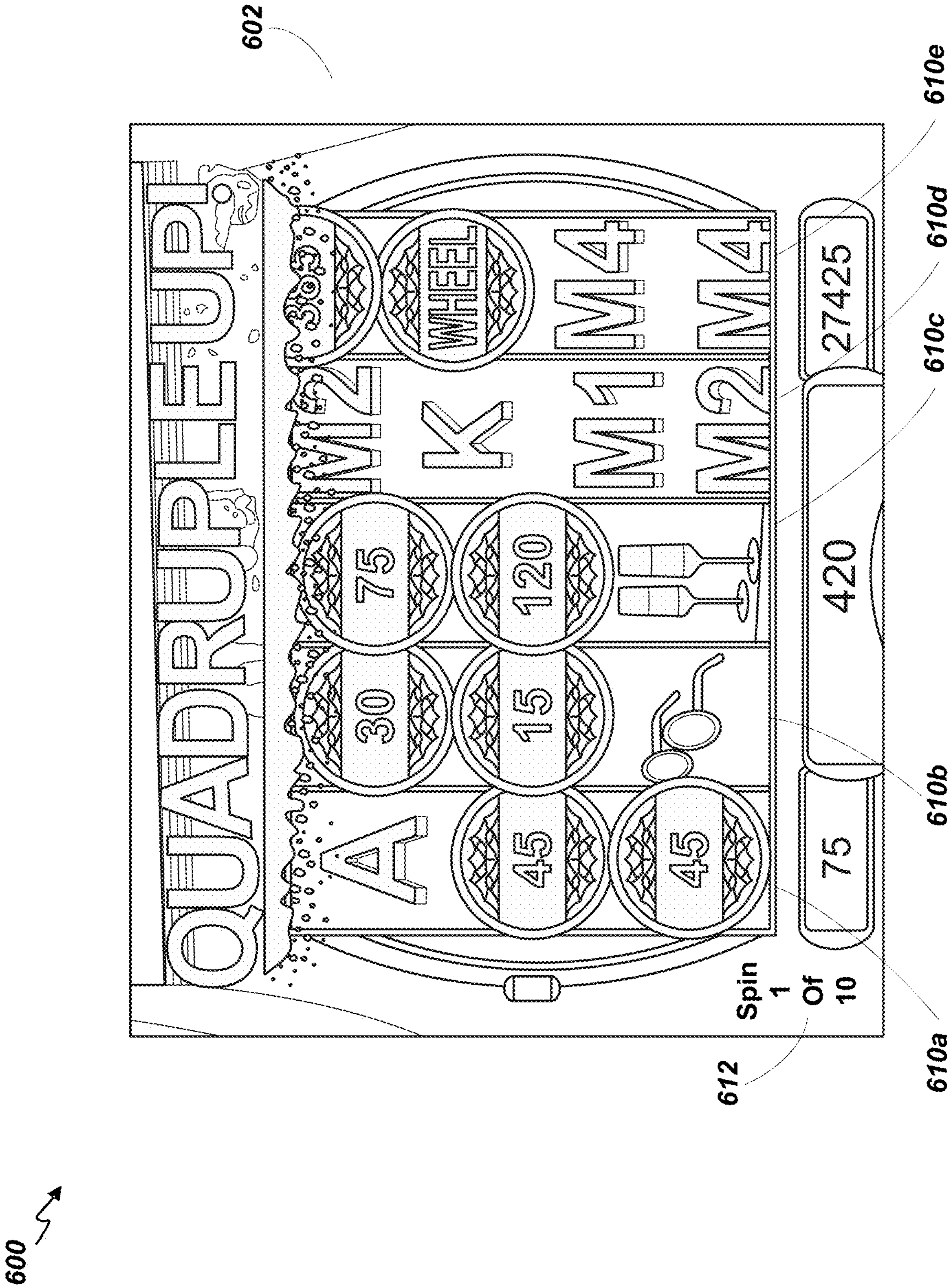
FIG. 6 illustrates a view of an exemplary user interface for a bonus game in accordance with various embodiments of the disclosure.

FIG. 6 illustrates a view of an exemplary user interface for a bonus game in accordance with various embodiments of the disclosure. FIG. 6 shows bonus game interface 600 of wagering game after a player has selected a volatility option 502-506 using volatility selection interface 500. Accordingly, in the example embodiment, a first bonus matrix 602 is presented and a plurality of reel are spun and stopped, as described herein, to provide at least a portion of a reel outcome, including a plurality of symbols, within first bonus matrix 602. In addition, the volatility option 502-506 selected by the player is identified above matrix 508. In this example, the phrase "QUADRUPLE UP!" is displayed above matrix 508 to indicate that the player has chosen the quadruple volatility option 506.

The bonus game shown in bonus game interface 600 includes a quantity of free spins, as selected by the player in the volatility selection interface 500. The quantity of free spins remaining may also be displayed in a screen or display device (e.g., display device 240 or 242) displaying the bonus game interface 600. Each spin of the quantity of free spins remaining is displayed to the player via matrix 508 and any awards are presented. For each spin of the free spin game, when a trigger condition for matrix replication exists, the double, triple, or quadruple option (as selected by the player) may be activated. For example, if the player selected the double option and a matrix replication trigger condition exists in the outcome (or partial outcome), a second matrix (not shown in FIG. 6) may be added to bonus game interface 600 with certain symbols from matrix 602 replicated onto the second matrix. Similarly, for the triple option, two matrices may be added and for the quadruple option, three matrices may be added.

In various embodiments, the trigger condition is the display of at least one configurable symbol in columns 610*a*, 610*b*, and 610*c*. In some embodiments, a configurable symbol 406 includes, as shown at FIG. 4, a cash or credit value (e.g., 15 credits, 30 credits, 45 credits, etc). In some embodiments, a configurable symbol is dynamically configurable to display a cash or credit value during play of bonus game, such as based upon a random number generated for the purpose of determining a cash or credit value to be displayed on the configurable symbol.

In various embodiments, the trigger condition may include a certain (predetermined, or randomly determined) quantity of configurable symbols occurring in the outcome (or partial outcome).

In some embodiments, as described herein, processor 204 may determine to display the double, triple, or quadruple option when stopped columns 610*a*, 610*b*, and 610*c* each display at least one configurable symbol. If this is determined, then reels corresponding to columns 610*d* and 610*e* may be displayed as spinning while the double, triple, or quadruple option (as selected previously by the player) is displayed. In various embodiments, some *such as reels 610*a-c*) or all reels in matrix 602 may be stopped prior to the activation of the double, triple, or quadruple feature.

As seen in FIG. 6, bonus game interface 600 shows columns 610*a*, 610*b*, and 610*c* stopped spinning, and displaying 6 configurable symbols, at least one each in columns 610*a*, 610*b*, and 610*c*, thus satisfying the trigger condition for matrix replication. Since reels 610*d* and 610*e* are still displayed as spinning, a complete outcome for that one spin (spin 1 of 10) as indicated by free spin count 612, is not displayed on bonus game interface 600. In various embodiments, the complete outcome (i.e., reel stop positions for reels 610*a-e*) is determined prior to stopping any of the reels and then reel spin and stop is animated to show each reel stopping sequentially. Since the partial outcome shown in FIG. 6 includes the trigger condition for matrix replication, processor 204 may initiate matrix replication based on the used selected volatility option. In this case, the user selected volatility option corresponds to a quadruple option, in which case, matrix 602 may be replicated into 3 additional matrices, resulting in a total of four matrices being displayed.

In at least some embodiments, processor 204 may not always display the bonus matrices when reel strips are stopped on columns 610*a-c*. Rather, in at least some embodiments, processor 204 may display bonus matrices while reels 610*a-e* are all displayed as spinning. This builds an anticipation amongst the player that a matrix replication event is about to occur.

However, if during a particular free game, the threshold number of configurable symbols are not displayed (i.e., the trigger condition is not met, for example, the threshold number of configurable symbols are not displayed in the leftmost three 610*a-e*) processor 204 may not display the additional matrices corresponding to the player selected (double, triple, or quadruple) option for that play of the free game of the plurality of free games. Rather, in such a case, the symbols displayed in matrix 602 may be evaluated by processor 204 to determine winning symbol combinations, and gameplay of bonus game may proceed to a next free game in the awarded quantity of free games, provided another free game remains. In at least one embodiment, as described above, the threshold number of configurable symbols needed to cause display of bonus matrices is three configurable symbols, one from the reels displayed in each column 610*a-c*

Figure 7:
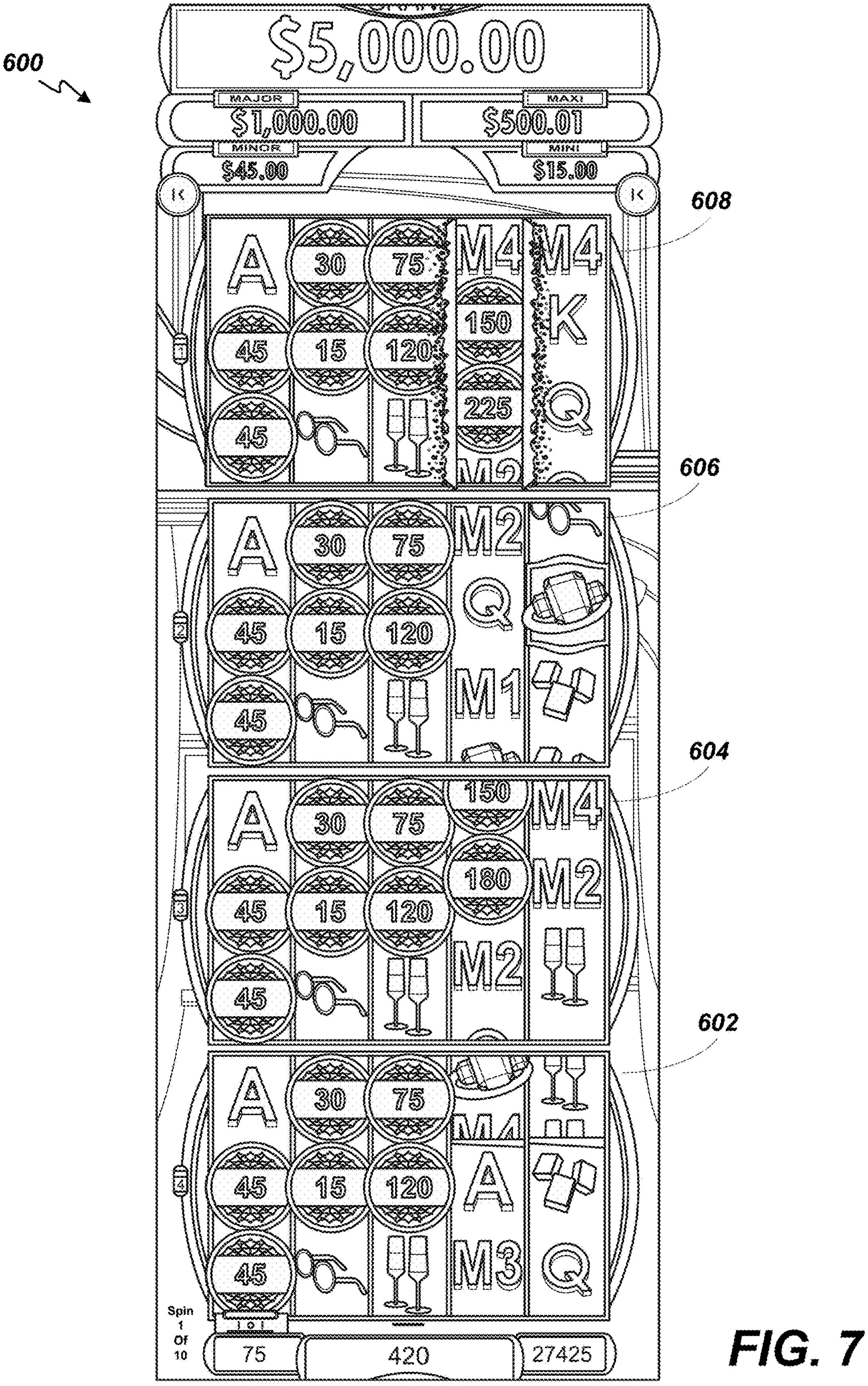
FIG. 7 illustrates a view of an exemplary user interface for a bonus game in accordance with various embodiments of the disclosure.

FIG. 7 illustrates a view of an exemplary user interface for a bonus game in accordance with various embodiments of the disclosure. FIG. 7 shows bonus game interface 600, in which the player has selected the quadruple volatility option 506, and in which all bonus matrices 604-608 are displayed during a free game, such as in response to the occurrence of a matrix replication trigger event, as shown in FIG. 6. More particularly, as shown and as described above, symbols are displayed in columns 610*a-c* of first bonus matrix 602 and replicated up into the same columns of the newly added bonus matrices 604-608. This occurs while reels 610*d-e* continue to spin of all matrices 602-608. However, in some embodiments, it may occur after all reels have stopped spinning in matrix 602.

Processor 204 may then display reels 610*d-e* stopped for each of the matrices 604-608 to populate the symbol positions with symbols from their respective reel strips. In certain embodiments, each matrix 602-608 may use different sets of reel strips for reels 610*d-e*. For example, the reel strips may have different symbols or configurable symbols with higher cash values to account for the volatility selection. Further, in certain embodiments, each matrix that is associated with a volatility pick may have a different set of reels. For example, matrix 604 (shown in FIG. 7) associated with volatility selection 506 may use a different set of reels for one or more reels 610*a-e*, than another matrix that is associated with volatility selections 502 or 504.

In response to each bonus matrix 602-608 being populated by symbols, processor 204 evaluates the symbols displayed in each matrix 602-608 to determine whether there are any winning symbol combinations in any of the matrices 602-608, and provides an award to the player associated with the winning symbol combinations in each matrix 602-608. For example, a first award (or a first group of awards) may be provided from first bonus matrix 602, a second award (or a second group of awards) may be provided from second bonus matrix 604, a third award (or third group of awards) may be provided from third bonus matrix 606, and a fourth award (or fourth group of awards) may be provided from fourth bonus matrix 608. Moreover, in at least some embodiments, an aggregate award of the awards provided in association with each displayed bonus matrix (e.g., the first, award, the second award, the third award, and the fourth award) may be provided. For example, in various embodiments, awards may include a sum of the values displayed by the configurable symbols in all of the displayed matrices 602-608 and/or any line wins (or Reel Power wins) in addition to or instead of the sum of the values of the configurable symbols.

In certain embodiments, values displayed by configurable symbols may only be awarded when a certain number of consecutive reels or columns 602*a-e* display the configurable symbols in the outcome. In certain of these embodiments, the consecutive columns must be left or right or right to left. Further, the first column in the set of consecutive columns must be the leftmost column (for a left to right evaluation) or the rightmost column (for a right to left evaluation).

Thereupon, if the player has any free games remaining (e.g., of the original fifteen, twelve, or ten free games associated with the selected volatility option 502-506), the player may select a Spin button to use a next free game in the series of awarded free games, whereupon the bonus matrices 602-608 displayed are reduced to the single initial first bonus matrix 602. In some embodiments, once a trigger event occurs to display one or more bonus matrices 604-608, the bonus matrices 604-608 may remain for a quantity of additional spins up to the duration of the plurality of free games. The quantity may be predetermined, randomly determined, based on a trigger event, based on a wager amount, etc. In such an embodiment, symbols may only be replicated up from the first bonus matrix 602 into other bonus matrices 604-608 when the requisite number of configurable symbols are displayed in an outcome (or partial outcome) for bonus matrix 602. This process continues until the quantity of free games available are exhausted, at which point, gameplay may return to the base game of wagering game 400 (e.g., matrix 402).

In the example embodiment, processor 204 may add each of the additional bonus matrices 604-608 above first bonus matrix 602, see seen in FIG. 7. In another embodiment, bonus matrices 604-608 may be added visually to the side or below first bonus matrix 602. Whatever the case, however, in at least some embodiments, processor 204 may, in addition, replicate the symbols stopped and displayed in columns 610*a-c* of first bonus matrix 602 into columns 610*a-c* of the newly added bonus matrices 604-608 when bonus matrices 604-608 are added during a free game, as described herein. This replication may be performed while the reel strips continue to spin in the rightmost columns (i.e., columns 610*d-e*) or all columns of all bonus matrices 602-608. However, as described herein, in various embodiments, all reels in matrix 602 may be stopped prior to the activation of the double, triple, or quadruple feature.

Figure 8A:
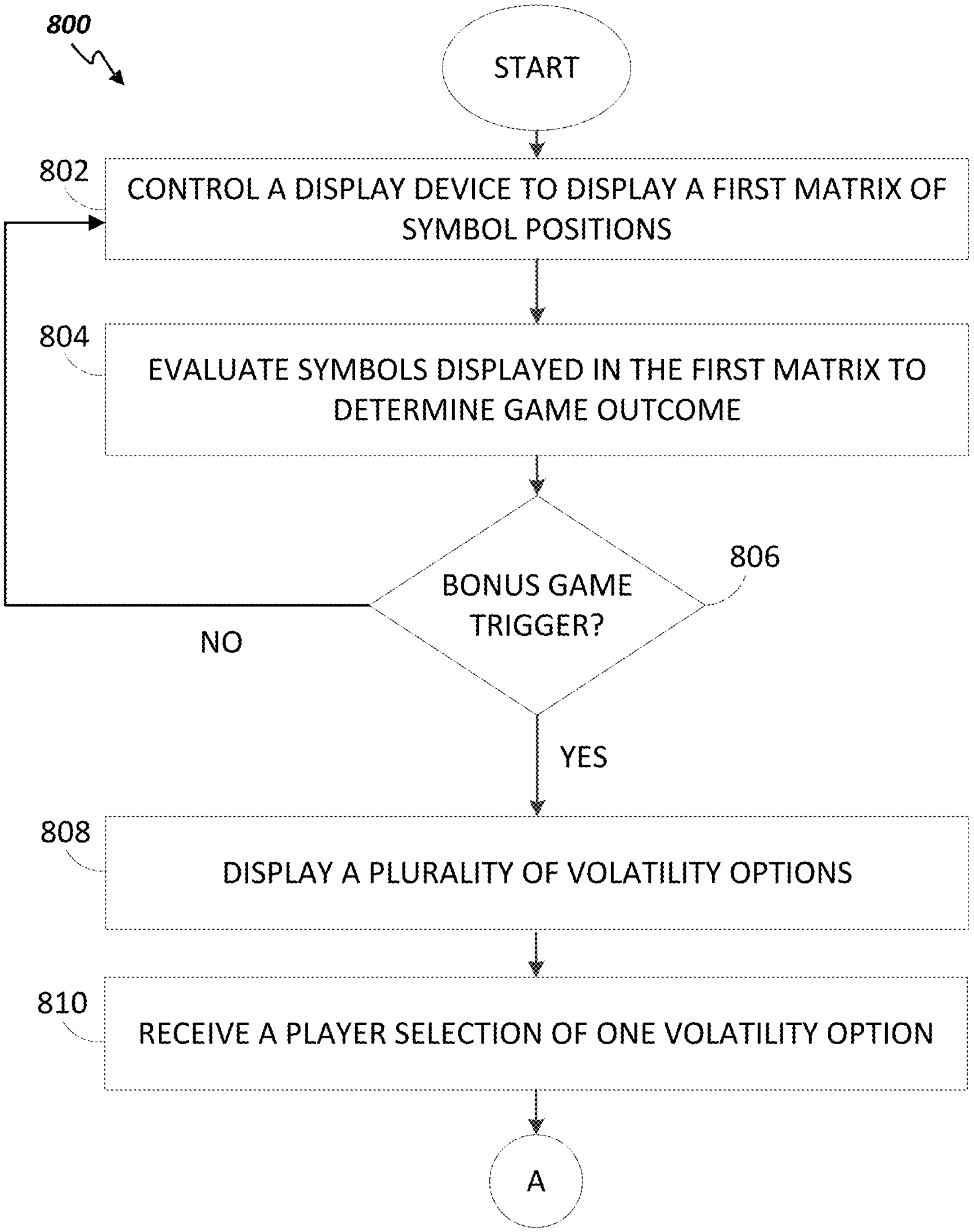
FIG. 8A is a first portion of an exemplary flowchart illustrating a process for playing the wagering game in accordance with various embodiments of the disclosure.
Figure 8B:
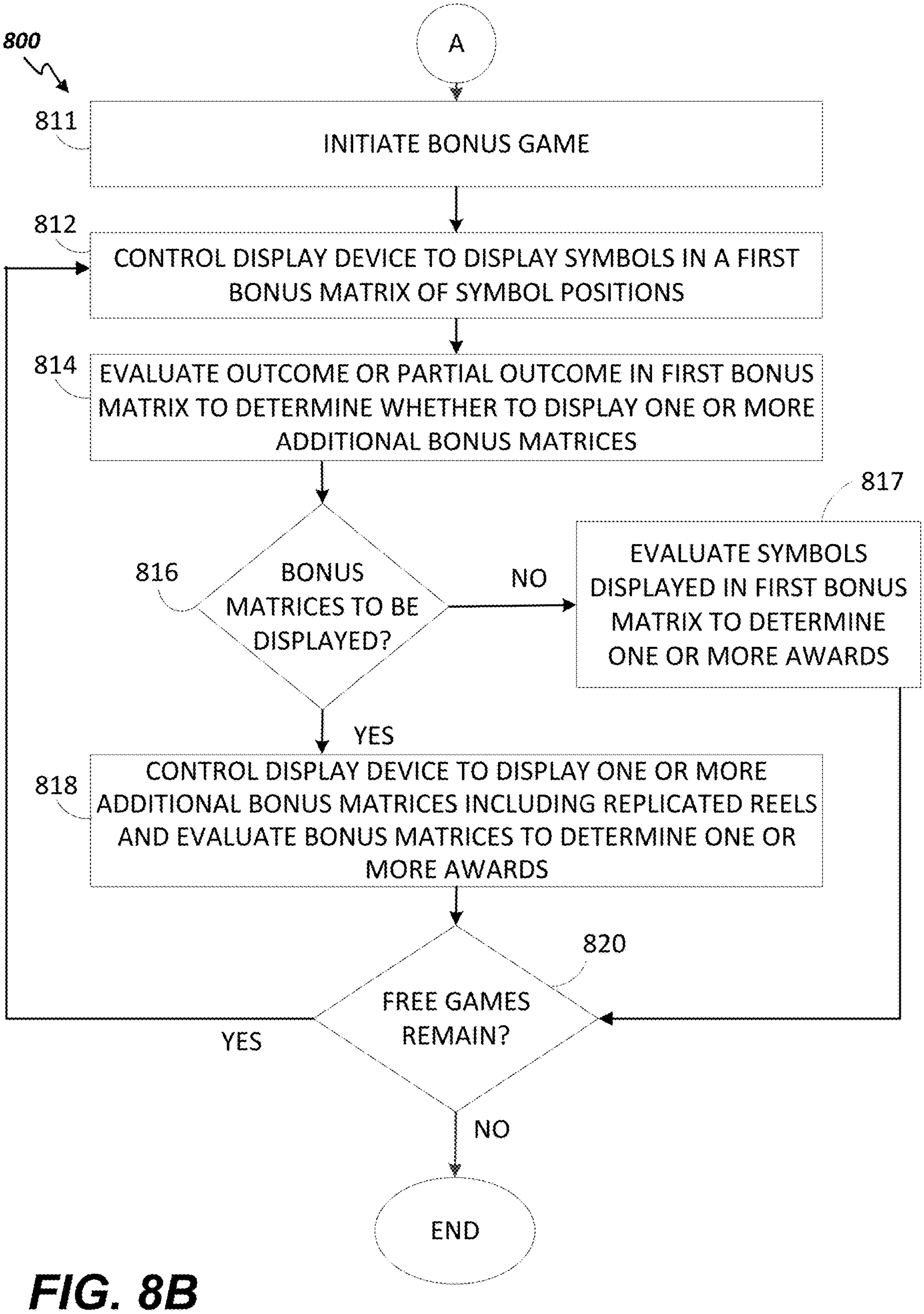
FIG. 8B is a second portion of the exemplary flowchart beginning at FIG. 8A.

FIGS. 8A and 8B show a flowchart illustrating a process 800 executed by a gaming machine in accordance with various embodiments described herein. Accordingly, processor 204 may control a display device, such as display device 240 and/or 242, to display matrix 402, such as in response to a player wager and/or input, at block 802. Matrix 402 may display the outcome of a play of a game, such as a wagering game whereby the symbols are selected and displayed at the various positions in matrix 402. As described herein, the symbols may be selected by one or more processes, such as a process described in relation to FIG. 3 that uses a random number generator to select the symbols. Processor 204 may determine whether the symbols displayed in matrix 402 form one or more symbol combinations stored in a paytable that corresponds to one or more award amounts or game wins associated with those symbol combinations, at block 804.

Processor 204 may, in addition, evaluate the symbols displayed in matrix 402 to determine whether to initiate a bonus game, such as a free game or free spin bonus, at block 806. In certain embodiments, the bonus game may be a hold and spin feature game. For instance, as described above, processor 204 may evaluate matrix 402 to determine whether one or more designated symbols, such as one or more FREE GAMES, symbols are included in the outcome of the play of the game and displayed in matrix 402. In certain embodiments, a bonus game may be initiated in response to a different trigger condition that is not based on certain symbols or symbol combinations, but instead may be based on a random trigger such as based on a random number generator, a central determination server, a progressive server, etc. In certain embodiments, a trigger condition may be the occurrence of a predetermined quantity of configurable symbols in the outcome.

In response to initiating bonus game, processor 204 may also display a plurality of volatility options via a volatility selection interface 500 (as seen in FIG. 5), at 808. If a trigger condition is not met for initiation of the bonus game, control may return to wait for another initiation of another base game.

Further, as described herein, when a bonus game is initiated and volatility options 502-506 are displayed, processor 204 may receive a player input of a selection of one volatility option 502-506 (e.g., the double, triple, or quadruple options), at block 810. Once a volatility option from the displayed volatility options 502-506 is selected by the player, processor 204 may control the display device 240 and/or 242 to initiate the play of the bonus game at block 811. In various embodiments, the bonus game is a free spins game where the quantity of free spins is based on the player selected volatility options.

At 812, processor 204 may initiate a first spin of the free spin bonus game, where a first bonus matrix 602 is displayed. Processor 204 may determine symbols to display in bonus matrix 602. In certain embodiments, processor 204 may determine symbols prior to initiating spin of reels 610*a-e*, or as the reels are spinning.

In the example embodiment, processor 204 may also evaluate the symbols displayed in first bonus matrix 602 (or a portion thereof) to determine whether to display one or more additional bonus matrices 604-608 at block 814.

If processor 204 determines that additional bonus matrices 604-608 are to be displayed (e.g., as described herein, if a sufficient number of configurable symbols appear in columns 610*a-c* of first bonus matrix 602), processor 204 may control the display device 240 and/or 242 to display the one or more additional bonus matrices 604-608, including one or more replicated reels, as described above, and the symbols displayed in each bonus matrix 604-608 may be evaluated to determine whether and which awards to provide to the player at blocks 816 and 818. In various embodiments, the awards that are provided include a sum of the values displayed by the configurable symbols in all of the displayed matrices 602-608 as a credit to the current credit balance or a bonus win meter. In various embodiments, the awards may include any line wins (or Reel Power wins) in addition to or instead of the sum of the values of the configurable symbols.

Once awards are provided, a determination whether any free games remain may be made, at 820. If free games remain, bonus matrices 604-608 may be removed so that matrix 602 is the only remaining matrix and an outcome or partial outcome for the next spin may be determined by processor 204.

If, at 816, processor 204 determines that bonus matrices 604-608 are not to be displayed during a given free spin game, the symbols displayed in first bonus matrix 602 may be evaluated to determine whether to provide one or more awards, such as, for example, a sum of the values displayed by the configurable symbols, one or more line wins (e.g., Reel Power wins), and the like, at 817, following which a determination may be made whether any free games remain, at 820.

In certain embodiments, when a matrix replication trigger condition exists in a free spin outcome, processor 204 may not always display all of the matrices that were indicated in the player selected volatility option. For example, for the player selected volatility option corresponding to the quadruple option, whereby a total of 4 matrices may be displayed—the first bonus matrix 602 that is displayed for each spin of the free spin bonus game, and 3 additional matrices based on the occurrence of a matrix replication trigger event. However, on the occurrence of the matrix replication trigger event, three additional matrices may not always be displayed. For example, processor 204 may make one or more random determinations to determine whether to display one, two or all three additional matrices. Processor 204 may use a weighted table to select the quantity of additional matrices to be displayed.

In certain embodiments, the number of matrices displayed may exceed the quantity corresponding to the player selected volatility option. For example, if the player selected the triple up volatility option, whereby a total of three matrices may be displayed, in certain spins, more than three matrices may be displayed. Processor 204 may use one or more random determinations to determine whether to display one or more additional matrix in excess of the quantity that corresponds to the player selected volatility option.

In certain embodiments, additional matrices are displayed for a spin in which the matrix replication trigger event occurs and after the completion of that spin, the additional matrices are removed from the display, leaving only a single bonus matrix 602 displayed on user interface 600. In certain embodiments, after the occurrence of the matrix replication trigger event, processor displays additional matrices for more than one spin. The quantity of additional matrices may be based on the player selected volatility option. The quantity of spins for which a matrix remains displays may also be based on the player selected volatility option, may be predetermined, may be randomly determined, etc., For example, for a higher quantity of matrices, the number of spins for which a matrix may remain displayed may be lower. Additionally, matrices may remain displayed if certain additional trigger conditions are satisfied. For example, such a trigger condition may be that for any of the matrices, the outcome includes a fourth column containing a configurable symbol.

Additionally, such an additional trigger condition may cause that matrix to replicate further. For example, if the player selected the double up volatility option and a matrix replication trigger event occurs for the outcome (or partial outcome) displayed in bonus matrix 602, then additional matrix 604 may be displayed by processor 204. If matrix 604 includes a further trigger condition, then matrix 604 may be replicated by processor 204. Such matrix replication may follow the matrix replication described herein. For example, only a partial outcome may be replicated.

In certain embodiments, the matrix replication trigger event may include a different quantity (one, two, one or more, etc) of reels with a configurable symbol in their outcome in order to initiate the matrix replication. For example, a matrix replication trigger event may require the leftmost two reels to include at least one configurable symbol each in the outcome for those reels. In certain embodiments, two or more reels may be interdependent. For example, if, during the play of the free games bonus game, a first and second reel include a configurable symbol in their outcomes, the third reel may always include a configurable symbol in its outcome or may have an altered (increased or decreased) probability of including a configurable symbol in its outcome.

In certain embodiments, the matrix replication trigger event may occur in the play of the base game instead of, or in addition to occurrence in the bonus game. In certain of these embodiments, where the matrix replication trigger event can occur in the base game, after its occurrence a bonus game with or without the volatility selection interface may be initiated.

In certain embodiments, after processor 204 replicates bonus matrix 604 based on the occurrence of a bonus matrix trigger event, the additional matrix may remain displayed in user interface 600 till the completion of the bonus game. In certain embodiments, a counter may be attached to one or more bonus matrices that indicates a number of spins for which the bonus matrix may remain displayed. In certain of these embodiments, as long as a bonus matrix remains displayed regardless of whether a subsequent replication condition exists, certain reels from bonus matrix 602 may be replicated into it. In certain embodiments, replication may only happen if the replication condition is satisfied subsequently.

In certain embodiments, reels 610*a*-610*e* are not replicated for matrices 604-608 at the occurrence of a matrix replication event. In certain embodiments, only the configurable symbols are replicated. For example, the configurable symbols may be overlaid on top of the existing reels in bonus matrices 604-608, thus allowing for additional configurable symbols to be displayed in those reels that contain the replicated configurable symbols (at positions other than the replicated configurable symbols). In certain embodiments, the configurable symbols are also not replicated and each reel for each matrix is independent of any other reel in the matrix.

Embodiments of the present disclosure thus provide systems and methods for providing a plurality of player selectable volatility options, each of which may be associated with a different number of bonus matrices and/or a different number of free games. The player selected volatility options may be provided in association with a bonus game, which may be triggered from a base game in response to the occurrence of one or more designated or trigger symbols. In addition, in response to selection of a volatility option, the plurality of bonus matrices associated with that option may be displayed and populated by symbols. Specifically, in at least one embodiment, symbols may be displayed in one or more columns of a first bonus matrix and replicated to corresponding columns of the other bonus matrices. The wagering game of the present disclosure therefore enables selection of a number of bonus matrices and population of those bonus matrices using replicated columns of symbols to achieve a unique and exciting volatility selection and bonus feature.

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

at least one memory with instructions stored thereon; and at least one processor in communication with the at least one memory, wherein the instructions, when executed by the at least one processor, cause the at least one processor to:

receive selection of a selected volatility option of a plurality of volatility options at at least one of a button or a touchscreen of the electronic gaming system, wherein each volatility option of the plurality of volatility options is associated with a respective number of reel strips of a plurality of reel strips stored in the at least one memory, a respective number of pluralities of symbol positions, and a respective number of plays, and wherein the selected volatility option is associated with a selected number of pluralities of symbol positions and a selected number of plays for an electronic game;

cause display of a partial outcome associated with a play of the selected number of plays of the electronic game and a subset of a first plurality of symbol positions, the partial outcome satisfying a trigger condition and comprising a first number of symbols on a first number of reels of the first plurality of symbol positions while a second number of reels of the first plurality of symbol positions are still spinning;

based upon the partial outcome satisfying the trigger condition, cause display of at least one additional plurality of symbol positions in accordance with the selected number of pluralities of symbol positions for the play of the electronic game, the first number of symbols being replicated at the first number of reels of the at least one additional plurality of symbol positions;

while the second number of reels of the first plurality of symbol positions are still spinning:

identify, from the plurality of reel strips stored in the at least one memory, the respective number of reel strips associated with the selected volatility option;

perform a lookup in the at least one memory to determine at least one reel strip of the respective number of reel strips associated with the volatility option to cause to be displayed as spinning at a second number of reels of the at least one additional plurality of symbol positions; and cause the at least one reel strip to be displayed as spinning at the second number of reels.

2. The electronic gaming system of claim 1, wherein the instructions further cause the at least one processor to receive the selection of the selected volatility option, wherein the selection is based on at least one of an input amount for the play of the electronic game or a player input of the selected volatility option.

3. The electronic gaming system of claim 1, wherein the instructions further cause the at least one processor to cause display of the at least one additional plurality of symbol positions for the play of the electronic game, wherein when the first plurality of symbol positions and the at least one additional plurality of symbol positions are displayed, the respective number of pluralities of symbol positions are displayed.

4. The electronic gaming system of claim 1, wherein causing display of the subset of the first plurality of symbol positions being replicated at the at least one additional plurality of symbol positions comprises replicating the partial outcome to the at least one additional plurality of symbol positions.

5. The electronic gaming system of claim 1, wherein the electronic game comprises a bonus game, and wherein the instructions further cause the at least one processor to cause display of the first plurality of symbol positions upon the bonus game being triggered.

6. The electronic gaming system of claim 1, wherein the instructions further cause the at least one processor to cause display of the subset of the first plurality of symbol positions being replicated at the at least one additional plurality of symbol positions, wherein the subset of the first plurality of symbol positions comprises a reel and wherein the at least one additional plurality of symbol positions comprises at least one different reel, and wherein symbols displayed on the reel are displayed as being replicated on the at least one different reel as other reels of the first plurality of symbol positions remain spinning.

7. The electronic gaming system of claim 1, wherein a plurality of lookup tables are stored in the at least one memory, and wherein each volatility option of the plurality of volatility options is associated with a respective at least one lookup table of the plurality of lookup tables.

8. The electronic gaming system of claim 7, wherein the instructions further cause the at least one processor to select the respective at least one lookup table of the plurality of lookup tables associated with the selected volatility option based upon the selection of the selected volatility option.

9. The electronic gaming system of claim 8, wherein the instructions further cause the at least one processor to determine the outcome for the play of the electronic game based upon an output from a random number generator (RNG) and the respective at least one lookup table associated with the selected volatility option.

10. An electronic gaming device comprising:

at least one memory with instructions stored thereon; and at least one processor in communication with the at least one memory, wherein the instructions, when executed by the at least one processor, cause the at least one processor to:

receive selection of a selected volatility option of a plurality of volatility options based upon an input at at least one of a button or a touchscreen, wherein each volatility option of the plurality of volatility options is associated with a respective number of reel strips of a plurality of reel strips stored in the at least one memory, a respective number of pluralities of symbol positions, and a respective number of plays, and wherein the selected volatility option is associated with a selected number of pluralities of symbol positions and a selected number of plays for an electronic game;

cause display of a partial outcome associated with a play of the selected number of plays of the electronic game and a subset of a first plurality of symbol positions, the partial outcome satisfying a trigger condition and comprising a first number of symbols on a first number of reels of the first plurality of symbol positions while a second number of reels of the first plurality of symbol positions are still spinning;

based upon the partial outcome satisfying the trigger condition, cause display of at least one additional plurality of symbol positions in accordance with the selected number of pluralities of symbol positions for the play of the electronic game, the first number of symbols being replicated at the first number of reels of the at least one additional plurality of symbol positions;

while the second number of reels of the first plurality of symbol positions are still spinning:

identify, from the plurality of reel strips stored in the at least one memory, the respective number of reel strips associated with the selected volatility option;

perform a lookup in the at least one memory to determine at least one reel strip of the respective number of reel strips associated with the volatility option to cause to be displayed as spinning at a second number of reels of the at least one additional plurality of symbol positions; and cause the at least one reel strip to be displayed as spinning at the second number of reels.

11. The electronic gaming device of claim 10, wherein the instructions further cause the at least one processor to receive the selection of the selected volatility option, wherein the selection is based on at least one of an input amount for the play of the electronic game or a player input of the selected volatility option.

12. The electronic gaming device of claim 10, wherein the instructions further cause the at least one processor to cause display of the at least one additional plurality of symbol positions for the play of the electronic game, wherein when the first plurality of symbol positions and the at least one additional plurality of symbol positions are displayed, the respective number of pluralities of symbol positions are displayed.

13. The electronic gaming device of claim 10, wherein causing display of the subset of the first plurality of symbol positions being replicated at the at least one additional plurality of symbol positions comprises replicating the partial outcome to the at least one additional plurality of symbol positions.

14. The electronic gaming device of claim 10, wherein the electronic game comprises a bonus game, and wherein the instructions further cause the at least one processor to cause display of the first plurality of symbol positions upon the bonus game being triggered.

15. The electronic gaming device of claim 10, wherein the instructions further cause the at least one processor to cause display of the subset of the first plurality of symbol positions being replicated at the at least one additional plurality of symbol positions, wherein the subset of the first plurality of symbol positions comprises a reel and wherein the at least one additional plurality of symbol positions comprises at least one different reel, and wherein symbols displayed on the reel are displayed as being replicated on the at least one different reel as other reels of the first plurality of symbol positions remain spinning.

16. At least one non-transitory computer-readable storage medium with instructions stored thereon that, in response to execution by at least one processor, cause the at least one processor to:

receive selection of a selected volatility option of a plurality of volatility options based upon an input at at least one of a button or a touchscreen, wherein each volatility option of the plurality of volatility options is associated with a respective number of reel strips of a plurality of reel strips stored in the at least one non-transitory computer-readable storage medium, a respective number of pluralities of symbol positions, and a respective number of plays, and wherein the selected volatility option is associated with a selected number of pluralities of symbol positions and a selected number of plays for an electronic game;

cause display of a partial outcome associated with a play of the selected number of plays of the electronic game and a subset of a first plurality of symbol positions, the partial outcome satisfying a trigger condition and comprising a first number of symbols on a first number of reels of the first plurality of symbol positions while a second number of reels of the first plurality of symbol positions are still spinning;

based upon the partial outcome satisfying the trigger condition, cause display of at least one additional plurality of symbol positions in accordance with the selected number of pluralities of symbol positions for the play of the electronic game, the first number of symbols being replicated at the first number of reels of the at least one additional plurality of symbol positions;

while the second number of reels of the first plurality of symbol positions are still spinning:

identify, from the plurality of reel strips stored in the at least one non-transitory computer-readable storage medium, the respective number of reel strips associated with the selected volatility option;

perform a lookup in the at least one non-transitory computer-readable storage medium to determine at least one reel strip of the respective number of reel strips associated with the volatility option to cause to be displayed as spinning at a second number of reels of the at least one additional plurality of symbol positions; and cause the at least one reel strip to be displayed as spinning at the second number of reels.

17. The at least one non-transitory computer-readable storage medium of claim 16, wherein the instructions further cause the at least one processor to receive the selection of the selected volatility option, wherein the selection is based on at least one of an input amount for the play of the electronic game or a player input of the selected volatility option.

18. The at least one non-transitory computer-readable storage medium of claim 16, herein the instructions further cause the at least one processor to cause display of the at least one additional plurality of symbol positions for the play of the electronic game, wherein when the first plurality of symbol positions and the at least one additional plurality of symbol positions are displayed, the respective number of pluralities of symbol positions are displayed.

19. The at least one non-transitory computer-readable storage medium of claim 16, wherein causing display of the subset of the first plurality of symbol positions being replicated at the at least one additional plurality of symbol positions comprises replicating the partial outcome to the at least one additional plurality of symbol positions.

20. The at least one non-transitory computer-readable storage medium of claim 16, wherein the instructions further cause the at least one processor to cause display of the subset of the first plurality of symbol positions being replicated at the at least one additional plurality of symbol positions, wherein the subset of the first plurality of symbol positions comprises a reel and wherein the at least one additional plurality of symbol positions comprises at least one different reel, and wherein symbols displayed on the reel are displayed as being replicated on the at least one different reel as other reels of the first plurality of symbol positions remain spinning.

* * * * *